106-97

United States Patent Office 2,837,436
Patented June 3, 1958

2,837,436
CONCRETE AND CEMENT

Edward P. Chapman, Jr., and John A. Wood, Albuquerque, N. Mex., assignors to Vernon F. Taylor, Jr.

No Drawing. Application August 10, 1954
Serial No. 449,006

5 Claims. (Cl. 106—97)

This invention relates to compositions of cement and concrete and especially to paving and structural concrete.

Among the objects of our invention is the provision of an inexpensive concrete of higher compressive strength and better flexural strength than similar heretofore known concretes, one which moreover employs readily available ingredients, and which possesses a substantially improved resistance to the attack of the corrosive waters encountered in actual practical use in paving and outdoor structures.

Other objects of our invention in part will be apparent and in part pointed out in the description of our invention which follows.

The invention accordingly resides in the combination of elements, composition of ingredients and mixture of materials as described herein, the scope of the useful application of which forms the subject of the claims at the end of this specification.

Before undertaking a description of our invention it is well to note at this point that great quantities of cement are employed in the building trades, in street and sidewalk construction and in highway construction. And the search constantly is for better cements and concretes, less expensive cements and longer life cement products. Many of the older concretes lack the desired compressive and flexural strengths and may lack sufficient life; they crack and spall under the conditions of corrosion and attack encountered in actual use where there are met a variety of weather conditions and the corrosive waters of many locales.

Accordingly an object of our invention is the provision of a cement and a concrete which are easily prepared from readily available materials and which possess long life under conditions of attack by corrosive waters and yet are strong and durable.

Considering now more especially the practice of our invention we find that a cement essentially consisting of Portland cement and anhydrous calcium sulphate possesses excellent physical characteristics. We find that compositions of our invention utilizing the anhydrite admix with Portland cement, with or without other additives, have provided to be of considerable interest and value in the manufacture and placement of structural and other concretes. Small additions of anhydrite to cement, or replacement by anhydrite admix amounting to 5% or more by weight of cement, impart valuable properties of increased stability and improved workability to freshly mixed concrete, enhance remarkably the resistance of the set-up concrete to breakdown by corrosive waters such as sodium sulphate solutions, and, further also increase the ultimate compressive strength developed by the concrete.

As a specific illustration of the practice of our invention the anhydrous calcium sulphate hereinafter sometimes referred to as "anhydrite admix" or "AAd" conveniently is prepared from naturally accurring earth deposits containing a major percentage of calcium sulphate. We dry the material obtained from the deposit, then grind it to a suitable particle size and subject it to calcining, preferably flame calcining.

Actually the deposit may be materially pure calcium sulphate but other minerals such as sand, soil, clay, sulphur, diatomite, and organic substances may be present. These various contaminants, providing they are present only in minor amount, do not detract from the valuable properties of our composition; they are rendered innocuous by conducting the calcining operation at a temperature of about 1200° F. or higher and especially by subjecting the source material to the action of an open flame as by passing the comminuted material in the form of a dust through the open flame. This not only effects a calcining but it also burns up the organic materials present. The particle size of the ground impure calcium sulphate preferably is such that less than 1% by weight is retained on a U. S. No. 20 sieve and not less than 75% passes a No. 100 sieve.

The physical properties and chemical composition of a comminuted calcined calcium-sulphate-containing earth are given in Table I which follows:

TABLE I

*Anhydrite admix*

PHYSICAL AND CHEMICAL PROPERTIES OF AAd (FROM GYPSIFEROUS-DIATOMACEOUS EARTH, ECTOR CO., TEXAS)

Specific gravity _____ 2.76
Density, absolute _____ 171.5 lbs./cu. ft.
Apparent bulk density _____ 82.0 lbs./cu. ft.
Absolute volume of 82.0 lbs. _____ 0.478 cu. ft.
Sieve analysis:

| U. S. Sieve No. | Weight Percent Retained | |
|---|---|---|
| | Individual | Cumulative |
| 20 | 0 | 0 |
| 30 | 0.5 | 0.5 |
| 50 | 3.7 | 4.2 |
| 100 | 17.9 | 22.1 |
| 140 | 7.4 | 29.5 |
| 200 | 12.6 | 42.1 |
| 270 | 7.8 | 49.9 |
| Pan | 50.1 | 100.0 |

Chemical analysis: Percent
$SiO_2$ _____ 20.3
$Al_2O_3$ _____ 1.4
$CaO$ _____ 30.5
$MgO$ _____ 0.29
$Na_2O$ _____ 0.96
$K_2O$ _____ 0.62
$SO_3$ _____ 39.1
$Cl$ _____ 1.2
$Fe$ _____ 0.37
Ign. loss (1000° C.) _____ 3.10

Water holding capacity—to form a stable slurry without appreciable water separation: 5.18 gallons (43.2 lbs.) per dry cubic foot (82 lbs.)
Cementitious value—nil, slurry still fluid after holding in constant temperature water bath at 100° F. for 7 days
Porosity—negligible. Density of 1:2 cement:admix slurry:

Lb./gal.
Atmospheric pressure _____ 14.2
10,000 p. s. i. _____ 14.3

Ease of handling—product non- caking, non-packing, free-flowing, and handled easily without any difficulty with conventional cement handling equipment
Abrasiveness—no greater than Portland cement In accordance with the provisions of our invention we mix and compounds the comminuted and calcined calcium sulphate with Portland cement in amounts of 1% up to about 10% or 15% by weight of cement. The cement mix in the amount of about 1 part is mixed with sand-gravel aggregates according to ordinary concrete practices. Typical concrete mixes in which AAd was used in all but the control mixes were made and tested as shown in Tables II and III.

TABLE II

*Concrete paving mixes*

|  | Control | 5% AAd | 10% AAd |
|---|---|---|---|
| Water_____gallons__ | 5.5 | 5.5 | 5.5 |
| Cement (ASTM Type I)_____pounds__ | 94 | 94 | 94 |
| Concrete sand (−#4 mesh)___pounds__ | 175 | 170.3 | 165.6 |
| 2″ to 1″ crushed gravel_____pounds__ | 163 | 163 | 163 |
| 1″ to #4 crushed gravel_____pounds__ | 163 | 163 | 163 |
| Anhydrite admix_____pounds__ | none | 4.7 | 9.4 |
| Slump_____inches__ | 4½ | 4 | 3½ |
| Sacks cement/cubic yard_____ | 6.3 | 6.3 | 6.3 |
| Compressive strength: |  |  |  |
| 28 day_____p. s. i._ | 3,890 | 5,030 | 3,350 |
| 90 day_____p. s. i._ | 4,933 | 6,023 | 5,870 |
| Flexural strength: |  |  |  |
| 28 day_____p. s. i._ | 699 | 698 | 529 |
| 90 day_____p. s. i._ | 731 | 745 | 754 |

The test specimens for compressive strength were cast in 6 inch diameter by 12 inch high waxed cardboard molds, and, after stripping from molds 24 hours after mixing, were stored in a moist room at 70° F. until time for tests. The flexural strength specimens were cast in 6 inch square by 42 inch length metal molds, and cured in the same manner as the compressive strength test cylinders.

The mix containing 10% AAd based on weight of cement, gained strength more slowly than the other two. Its 90 day strength figures, however, were not greatly different from those of the 5% mix, and both the 5% and the 10% AAd mixes were well above those for the control mix.

Typical concrete paving mixes comprising about 1 part cement or cement mix, 2 parts sand, and 3 parts gravel in which the anhydrous calcium sulphate amounts to about 5% by weight of cement or 2.5% by weight of sand are given in Table III.

TABLE III

*Concrete paving mixes*

|  | Control | 5% AAd additive | 5% AAd sand replacement | 5% AAd cement replacement |
|---|---|---|---|---|
| Water_____gallons__ | 5.6 | 5.6 | 5.6 | 5.6 |
| Cement (ASTM Type I) pounds__ | 94 | 94 | 94 | 89.3 |
| Sand (−#4 mesh)___pounds__ | 180 | 180 | 175.3 | 180 |
| 1½″ to ¾″ crushed gravel pounds__ | 126 | 126 | 126 | 126 |
| ¾″ to #4 crushed gravel pounds__ | 189 | 189 | 189 | 189 |
| Anhydrite admix___pounds__ | none | 4.7 | 4.7 | 4.7 |
| Sks. cement/cu. yd_____ | 6.34 | 6.30 | 6.34 | 6.02 |
| Slump_____inches__ | 2½ | 1¾ | 1½ | 2½ |
| Compressive strengths: |  |  |  |  |
| 28 day_____p. s. i._ | 4,970 | 5,535 | 5,472 | 5,040 |
| 90 day_____p. s. i._ | 5,810 | 6,630 | 6,515 | 6,145 |

The data of Tables II and III show that the concrete compositions of our invention develop higher compressive strengths and higher flexural strengths than do conventional concretes even when the cement content is cut back by an amount equal in absolute volume to the amount of anhydrite admix used.

A further remarkable property of the concretes of our invention is the great resistance to corrosive waters as compared with that of conventional concretes. This valuable characteristic is shown by a series of specimens of differing composition as given in Table IV, which were subjected to an accelerated sulphate resistance test. Speciments 1, 2, 3 and 4 were made with ASTM Type I cement, while specimens 5 and 6 were made with the moderately sulphate resisting ASTM Type II cement. In the pipe and structural mixes we employed about 1 part cement mix and 5 parts coarse sand, with the anhydrous calcium sulphate of the cement mix amounting to about 10% by weight of cement.

TABLE IV

*Concrete mixes for accelerated sulphate resistance tests*

|  | Pipe Mix [1] | | Structural [1] | | Structural [2] | |
|---|---|---|---|---|---|---|
|  | Control | AAd | Control | AAd | Control | AAd |
| Cement_____g__ | 530 | 530 | 592 | 592 | 592 | 592 |
| Sand (−#4 m.)____g__ | 2,732 | 2,679 | 3,074 | 3,015 | 2,527 | 2,468 |
| Anhydrite admix g__ | none | 53 | none | 59 | none | 59 |
| Water_____ml__ | 238 | 238 | 525 | 525 | 438 | 438 |

[1] ASTM Type I cement.
[2] ASTM Type II cement.

Speciments of the above composition were cast in triplicate in 2 inch cube molds, and cured under water for 7 days at 75° F. The specimens were then subjected alternately to 24 hours immersion in a saturated sodium sulphate solution at 75° F. and oven drying for 48 hours at 190° F. Alternate wetting and drying was contained until one set of specimens from each pair showed imminent signs of disintegration. The rate of deterioration was indicated by the weight losses occurring during the test, data for which are tabulated in Table V in which weight losses are given for each cycle in terms of percentage of the weight after the first drying period.

TABLE V

*Accelerated sulphate resistance tests*

SPECIMEN WEIGHT PERCENTAGE OF WEIGHT AFTER 1ST CYCLE

| Cycle | Pipe Mix [1] | | Structural [1] | | Structural [2] | |
|---|---|---|---|---|---|---|
|  | Control | AAd | Control | AAd | Control | AAd |
| 1 | 100 | 100 | 100 | 100 | 100 | 100 |
| 2 | 101.8 | 102.1 | 101.4 | 101.8 | 101.1 | 101.6 |
| 3 | 103.4 | 103.9 | 100.2 | 102.4 | 101.7 | 101.8 |
| 4 | 103.6 | 104.8 | 92.5 | 99.5 | 101.7 | 101.1 |
| 5 | 103.3 | 105.0 |  |  | 91.8 | 93.7 |
| 6 | 102.1 | 104.7 |  |  | 63.8 | 87.4 |
| 7 | 102.4 | 105.7 |  |  |  |  |
| 8 | 101.5 | 104.5 |  |  |  |  |
| 9 | 98.6 | 103.1 |  |  |  |  |
| 10 | 97.9 | 103.0 |  |  |  |  |
| 11 | 93.8 | 101.1 |  |  |  |  |

[1] ASTM Type I cement.
[2] ASTM Type II cement.

It is to be noted that for the three types of mixes shown above the weight losses begin usually with the control mixes (6th cycle for pipe mix, 3rd for structural (1) and 5th for structural (2)) and then proceed at a more rapid rate than for the mixes of our invention. A further remarkable difference in behavior toward sulphate exposure is in the manner of deterioration. We find that the specimens without our admix tend to crack severely, thus allowing deep penetration of the corrosive solution, and the falling off of chunks. In contrast to this, the specimens embodying our invention show little tendency to crack, check, or slough off chunks: they lose weight by the crumbling of thin layers successively from the surface, leaving a core of substantially sound concrete. In every case with specimens containing our admix sulphate deterioration is a surface phenomenon rather than a complete disruption of the specimens as it is for the plain concrete mixes.

Thus it will be seen that there has been provided in our invention a cement and concrete in which there are achieved the various objects hereinbefore set forth, together with many practical advantages. The cement and concrete are strong in compression and flexure. Moreover, they are somewhat less expensive than the heretofore known and commonly used cements and concretes. And, of particular importance, they are less susceptible to failure as a result of the attack of corrosive liquids.

Although the cement mix preferably contains anhydrous calcium sulphate in the amount of 5% to 10% by weight of cement good results are had where the amount of the calcium sulphate ranges from 1% up to 15% by weight of cement. And in the concretes, while best results are had with cement mix and aggregates in which the cement mix includes anhydrous calcium sulphate in the amount of 10% by weight of cement, good results are had where the amount of calcium sulphate ranges from 1% up to 15% and preferably 5% to 15% by weight of the cement.

As many possible embodiments may be made of our invention, and as many changes may be made in the embodiments set forth above, it will be understood that all matter described hereinbefore is to be considered as merely illustrative, and not by way of limitation.

We claim as our invention:

1. A cement mix for paving and structural concretes of increased compressive and flexural strengths and increased resistance to corrosive waters, said mix consisting of anhydrous calcium sulfate from about 5% to about 15% by weight and the remainder Portland cement.

2. A cement mix for concretes of increased compressive and flexural strengths and increased resistance to corrosive waters, said mix consisting of about 5% to about 10% by weight of anhydrous calcium sulfate of a particle size with less than 1% retained on U. S. No. 20 sieve and not less than 75% passing a No. 100 sieve, and remainder Portland cement.

3. A concrete mix of increased compressive and flexural strengths and increased resistance to corrosive waters consisting of about 1 part by weight of Portland cement mix and about 5 parts concrete aggregate, wherein is incorporated anhydrous calcium sulfate in amounts ranging from about 5% to about 15% by weight of the cement mix.

4. A concrete paving mix of increased compressive and flexural strengths and increased resistance to corrosive waters consisting, by weight, of about 1 part Portland cement mix, about 2 parts sand and about 3 parts gravel, wherein the cement mix consists of Portland cement and anhydrous calcium sulfate in amounts ranging from about 5% to about 10% by weight of cement mix.

5. A concrete pipe mix of increased resistance to corrosive waters consisting, by weight, of about 1 part Portland cement mix and about 5 parts coarse sand, wherein the cement mix consists of Portland cement and anhydrous calcium sulfate in the amount of about 5% to about 10% by weight of cement mix.

References Cited in the file of this patent

UNITED STATES PATENTS

| | | |
|---|---|---|
| 83,037 | Carr | Oct. 13, 1868 |
| 477,632 | Baker | June 28, 1892 |
| 494,763 | Smidth | Apr. 4, 1893 |
| 949,924 | Adams | Feb. 22, 1910 |
| 1,923,370 | Hansen | Aug. 22, 1933 |
| 2,103,216 | Dunn | Dec. 21, 1937 |
| 2,194,777 | Tyler | Mar. 26, 1940 |
| 2,240,744 | Arpin | May 6, 1941 |
| 2,512,067 | Linford | June 20, 1950 |
| 2,597,370 | Peckman | May 20, 1952 |

FOREIGN PATENTS

| | | |
|---|---|---|
| 5,591 | Australia | Jan. 17, 1927 |
| 6,123 | Australia | 1932 |
| 259,772 | Switzerland | 1949 |

OTHER REFERENCES

See p. 13 of Technical Paper 451 of Department of Commerce on the subject of "Calcium Sulphate Retarders for Portland Cement Clinker," by Ernest E. Berger (1929).